US006671191B2

(12) United States Patent
Hanaoka et al.

(10) Patent No.: US 6,671,191 B2
(45) Date of Patent: Dec. 30, 2003

(54) ELECTRIC POWER CONVERSION APPARATUS (75) Inventors: Hiroyuki Hanaoka, Toshima-ku (JP); Narumi Yanagisawa, Toshima-ku (JP); Hiroshi Sakaba, Toshima-ku (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 10/104,777

(22) Filed: Mar. 22, 2002

(65) Prior Publication Data
US 2002/0135328 A1 Sep. 26, 2002

(30) Foreign Application Priority Data
Mar. 22, 2001 (JP) ......................................... 2001-082875

(51) Int. Cl.[7] .......................... H02M 5/45; H02M 7/04; H02J 7/00
(52) U.S. Cl. ............................... 363/37; 363/89; 307/66
(58) Field of Search ............................ 363/37, 39, 41, 363/56, 98, 132, 127, 136, 34; 323/266, 272, 280; 307/66, 64, 72, 77

(56) References Cited

U.S. PATENT DOCUMENTS 5,123,746 A * 6/1992 Okado .......................... 363/37
5,416,686 A * 5/1995 Azuma et al. ................. 363/37
5,654,591 A * 8/1997 Mabboux et al. ............. 307/66
6,445,089 B1 * 9/2002 Okui ............................ 307/66

FOREIGN PATENT DOCUMENTS

| JP | 07-298513 | 11/1995 |
| JP | 09/238481 | 9/1997 |
| JP | 10-255144 | 8/1998 |
| JP | 2001-157441 | 6/2001 |

* cited by examiner

Primary Examiner—Rajnikant B. Patel
(74) Attorney, Agent, or Firm—Rankin, Hill, Porter & Clark LLP (57) ABSTRACT An electric power conversion apparatus is provided which can protect the electric power conversion circuit against an overcurrent even when the interrupting circuit for preventing an inflow of an overcurrent into the input side caused by phase deviations between an input voltage and an output voltage uses switching means with a slow responsiveness. The switching means used in the interrupting circuit 2 have a slower response speed than those of semiconductor switching elements. The overcurrent detection circuit 3 checks whether the input current is an overcurrent. For as long as an overcurrent is detected by the overcurrent detection circuit 3, the command input blocking circuit 4 blocks the instantaneous current control signal and the instantaneous voltage control signals from being fed into the drive signal generation circuit 5. As the duration of overcurrent increases, the interrupting circuit 2 is activated to interrupt the current inflow.

10 Claims, 5 Drawing Sheets

ELECTRIC POWER CONVERSION APPARATUS

BACKGROUND OF THE INVENTION

The present invention relates to an electric power conversion apparatus for converting an AC power into a DC power and then reconverting the AC power into the DC power.

An electric power conversion apparatus of so-called 3-arm system has been known. An electric power conversion circuit used in this conventional power conversion apparatus comprises a first switch group having a plurality of series-connected switching circuits each having a switching element constructed of a transistor capable of controlling an electric conduction in one direction and a diode anti-parallelly connected with the switching element, second and third switch groups constructed in a way similar to the first switch group, and a capacitor, with the first switch group, the second switch group, the third switch group and the capacitor connected in parallel. This power conversion circuit consists of three switch groups and thus is called a 3-arm system with each switch group taken as one arm. This power conversion circuit full-wave rectifies an AC power by the first switch group and the second switch group to charge the capacitor and converts a DC voltage appearing across the capacitor into an AC voltage by the second switch group and the third switch group, thus reconverting the DC power into the AC power.

The conventional power conversion apparatus of 3-arm system has a problem that, since the second switch group is used for both power rectification and inversion, any shift in phase between an input voltage and an output voltage causes a large current to flow into the input side. A conventional practice to deal with this problem involves detecting abnormal conditions in frequency and phase at high speed and, when any anomaly is detected, interrupting the electric power conversion circuit from the electric power system by activating thyristor switches connected anti-parallel and arranged in the input side. However, the interrupting circuit using the thyristor switches is expensive and requires a drive circuit that outputs a higher voltage than that of a logic circuit, making it difficult to reduce the cost of the electric power conversion apparatus.

An object of the present invention is to provide an electric power conversion apparatus using a so-called 3-arm type power conversion circuit which can use a switching means with a low response speed as an interrupting circuit to prevent an overcurrent from flowing into the input side when a phase shift or difference occurs between the input voltage and the output voltage.

Another object of the present invention is to provide an electric power conversion apparatus which can protect the electric power conversion circuit from an overcurrent even when a switching means with a low response speed is used as an interrupting circuit.

Still another object of the present invention is to provide an inexpensive power conversion apparatus.

SUMMARY OF THE INVENTION

According to one aspect, the present invention provides an electric power conversion apparatus which comprises: an electric power conversion circuit having a first switch group, a second switch group, a third switch group, and a capacitor, all connected in parallel, the first switch group comprising a plurality of series-connected switching circuits, each having a switching element capable of controlling an electric conduction in one way and a diode connected anti-parallel to the switching element, the second and third switch groups being constructed in the same way as the first switch group; a reactor (first reactor) connected between an intermediate point in the first switch group and one of two input terminals of an AC power supply; an instantaneous current control system for outputting an instantaneous current control signal according to a DC voltage command value; an instantaneous voltage control system for outputting an instantaneous voltage control signal according to an output voltage command value; a drive signal generation circuit for receiving the instantaneous current control signal and the instantaneous voltage control signal and applying drive signals at predetermined timings to a plurality of the switching elements making up the first to third switch groups of the electric power conversion circuit to make the electric power conversion circuit perform a converter operation and an inverter operation; and an interrupting circuit connected between said one of the terminals of the AC power supply and the first reactor and adapted to enter an interrupting state to block the AC voltage of the AC power supply from being applied to the electric power conversion circuit when an overcurrent produced by a phase difference between the AC voltage of the AC power supply and the AC voltage converted by the electric power conversion circuit flows into the electric power conversion circuit.

More specifically, the electric power conversion apparatus of this invention further includes: a first connection circuit for electrically connecting an intermediate point in the second switch group to the other of the two input terminals of the AC power supply and to one of two AC output terminals; and a second connection circuit for electrically connecting an intermediate point in the third switch group to the other of the two AC output terminals through a second reactor.

For example, the drive signal generation circuit can be made to control conductions of a plurality of the switching elements making up the first and second switch groups to make the electric power conversion circuit perform the converter operation for charging the capacitor and to control conductions of a plurality of the switching elements making up the second and third switch groups to make the electric power conversion circuit perform the inverter operation for converting a DC voltage appearing across the capacitor into an AC voltage, thereby outputting the converted AC voltage from an intermediate point in the second switch group and from an intermediate point in the third switch group. It is also possible to charge the capacitor with only the first switch group.

In this invention, the interrupting circuit uses switching means with a slower response speed than that of semiconductor switching elements. Further, this invention includes a current detector for measuring an AC current flowing into the intermediate point in the first switch group and an overcurrent detection circuit for detecting an overcurrent based on an output of the current detector. The electric power conversion apparatus of this invention also includes a command input blocking circuit for blocking the instantaneous current control signal and the instantaneous voltage control signal from being applied to the drive signal generation circuit for as long as an overcurrent is detected by the overcurrent detection circuit.

As the phase difference between the input AC voltage and the output AC voltage of the electric power conversion circuit increases, an overcurrent flows in. The current flowing into the electric power conversion circuit is detected by the current detector. When the overcurrent detection circuit detects that the input current detected by the current detector is in excess of a predetermined value (there is an overcurrent), the command input blocking circuit blocks the instantaneous current control signal and the instantaneous voltage control signal from being applied to the drive signal generation circuit. This brings the switching elements making up the first to third switch groups of the electric power conversion circuit into a non-conducting state, thereby preventing an overcurrent from flowing through the switching elements and from destroying them. When the command input blocking circuit blocks the application of the instantaneous current control signal and the instantaneous voltage control signal to the drive signal generation circuit, the switching elements of the electric power conversion circuit become non-conducting, sharply reducing the overcurrent. As a result, the overcurrent detection circuit no longer detects the overcurrent and the command input blocking circuit allows the instantaneous current control signal and the instantaneous voltage control signal to be fed to the drive signal generation circuit. Hence, the electric power conversion circuit starts to perform the conversion operation again. If at this time the phase difference between the input AC voltage and the output AC voltage is still large, an overcurrent flows again. The overcurrent is detected by the overcurrent detection circuit, activating the command input blocking circuit in a manner described above to turn off the electric power conversion circuit. After this, until the phase difference between the input AC voltage and the output AC voltage becomes small enough, the above sequence of operation is repeated. If the overcurrent state continues to exist, the interrupting circuit with a low response speed is opened to completely interrupt the overcurrent. As described above, with this invention, until the interrupting circuit is opened, the command input blocking circuit intermittently interrupts an overcurrent, thereby protecting the switching elements used in the electric power conversion circuit from being destroyed by the overcurrent.

In protecting the switching elements by turning off the electric power conversion circuit, an output blocking circuit may be provided which blocks output signals of the drive signal generation circuit from being applied to the associated switching elements of the electric power conversion circuit. In that case, the electric power conversion circuit needs only to have a current detector for measuring an AC current flowing into the intermediate point in the first switch group, an overcurrent detection circuit for detecting an overcurrent based on the output of the current detector, and an output blocking circuit for blocking the drive signals from being output from the drive signal generation circuit for as long as an overcurrent is detected by the overcurrent detection circuit.

With this invention, even when the interrupting circuit, designed to block an overcurrent generated by a phase deviation between an input voltage and an output voltage from flowing into the input side, uses low-speed switches to lower the cost of the electric power conversion apparatus, the electric power conversion circuit can still be protected against an overcurrent.

DETAILED DESCRIPTION OF THE PREFERRED EMBODIMENTS

Figure 1:
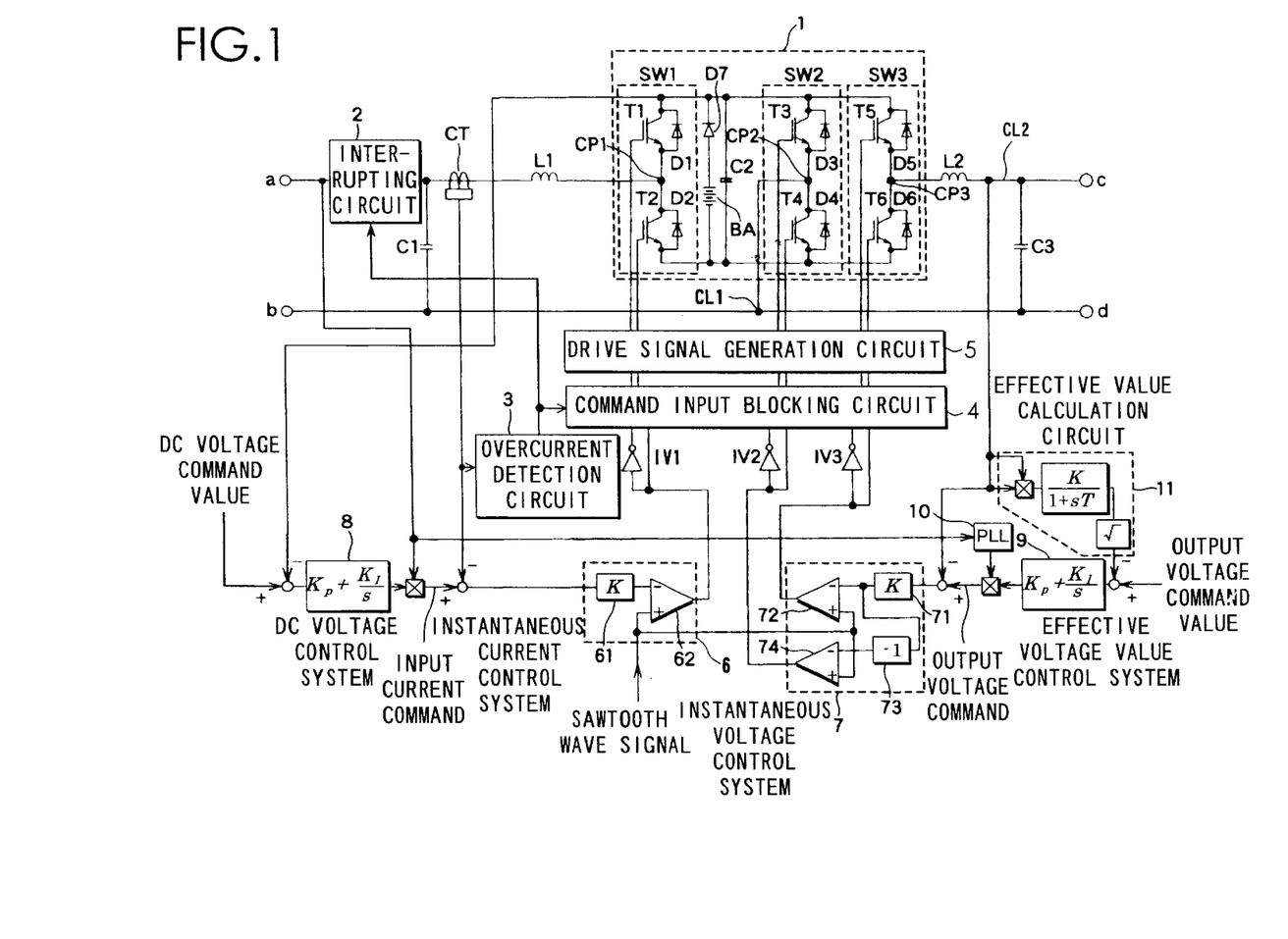
FIG. 1 is a circuit diagram showing a configuration of one embodiment of the electric power conversion apparatus according to the invention.
Figure 5:
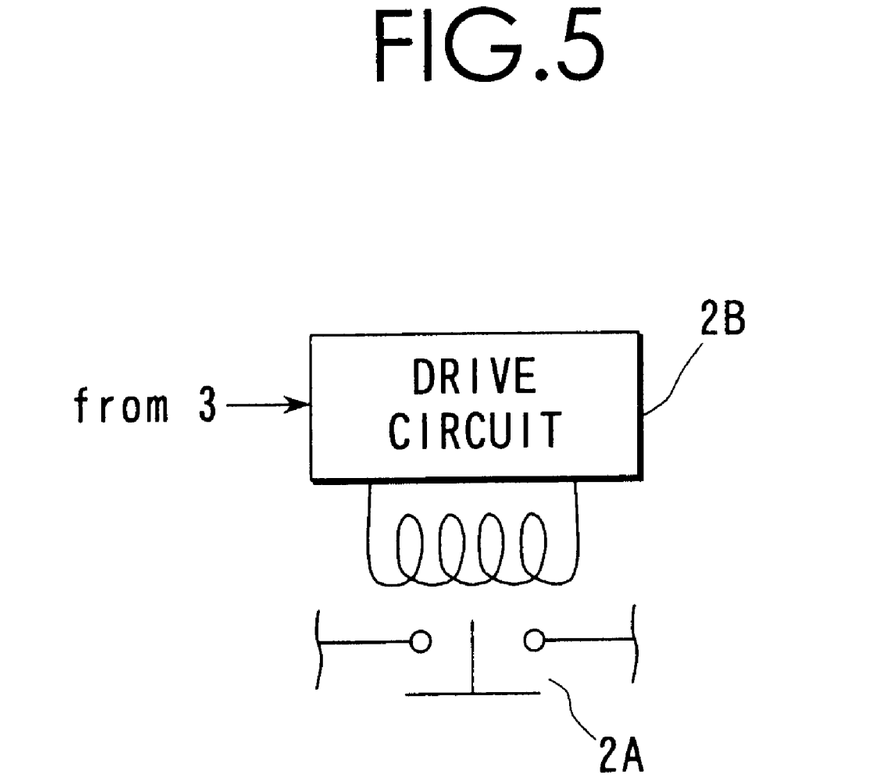
FIG. 5 is a circuit showing a configuration of the interrupting circuit.

Now, embodiments of the electric power conversion apparatus of the present invention will be described in detail by referring to the accompanying drawings. FIG. 1 is a circuit diagram showing a configuration of the electric power conversion apparatus as one embodiment of the invention. In FIG. 1, an electric power conversion circuit 1 of the electric power conversion apparatus comprises a first switch group SW1, a second switch group SW2, a third switch group SW3 and a capacitor C2, all connected in parallel. The first switch group SW1 comprises two switching circuits connected in series, with the first switching circuit having a switching element T1 of a transistor capable of controlling an electric conduction in one direction and a diode D1 connected anti-parallel to the switching element T1, and with the second switching circuit having a switching element T2 of a transistor and a diode D2 connected anti-parallel to the switching element T2. The second switch group SW2 and the third switch group SW3 also comprise, as in the first switch group, switching elements T3–T6 and diodes D3–D6. Between an intermediate point CP1 in the first switch group SW1 and one input terminal a of an AC power supply, an interrupting circuit 2 and a first reactor L1 are connected in series. In a feeder line between the interrupting circuit 2 and the first reactor L1, a current sensing member of a current detector CT such as a current transformer is installed. A capacitor C1 is connected between another input terminal b of the AC power supply and a connecting point between the interrupting circuit 2 and the first reactor L1. The interrupting circuit 2 is activated in an emergency, e.g., operation anomalies and input anomalies of other circuits, when an AC input current exceeds a predetermined value. The interrupting circuit 2 used in this embodiment comprises an inexpensive switching means, such as an electromagnetic relay shown in FIG. 5, with a slower response speed than that of an expensive interrupting circuit constructed of anti-parallelly connected two thyristors, and a drive circuit for driving the switching means. The interrupting circuit 2 is controlled by an overcurrent detection circuit 3 which, when the input current detected by the current detector CT exceeds a predetermined current reference value, decides that an input current is an overcurrent. As shown in FIG. 5, the drive circuit 2B of the interrupting circuit 2 integrates the output of the overcurrent detection circuit 3 and, for as long as the integrated value continues to increase, applies an excitation current to an electromagnetic coil. Hence, when the overcurrent detection circuit 3 continuously or intermittently detects an overcurrent for a certain period of time, the switching means (for example, a contact of the electromagnetic relay 2A) in the interrupting circuit 2 is interrupted (opened), stopping supplying an electric power to the electric power conversion circuit 1 from the AC power supply. The output of the overcurrent detection circuit 3 is fed to a command input blocking circuit 4, which blocks a command signal from entering into a drive signal generation circuit 5 while an overcurrent is detected by the overcurrent detection circuit 3. Further, an intermediate point CP2 in the second switch group SW2 is connected to the second AC input terminal b via a first connection circuit CL1. Between an intermediate point CP3 in the third switch group SW3 and one of two AC output terminals c is connected a second reactor L2. A circuit including the second reactor L2 is a second connection circuit CL2. Another AC output terminal d is connected to the AC input terminal b through the first connection circuit CL1. A capacitor C3 is connected between the AC output terminal c and the other AC output terminal d.

The capacitor C2 of the electric power conversion circuit 1 is connected in parallel to a series circuit of a diode 7 and a battery BA to operate as an uninterruptible power supply when the AC power supply fails or is interrupted. The DC power of the battery is used instead of the DC power of the capacitor C2 charged by the converter operation. In this case, a battery charging equipment needs to be provided for charging the battery at all times. The DC voltage appearing across the capacitor C2 is converted into an AC power by the second and third switch groups SW2, SW3, thus providing a function of an uninterruptible power supply.

Next, a configuration of a control system for the electric power conversion circuit 1 will be described. This control system mainly comprises an instantaneous current control system 6, an instantaneous voltage control system 7, a DC voltage control system 8 and an effective voltage value control system 9. The instantaneous current control system 6 receives an input current command based on a signal from the DC voltage control system 8. The DC voltage control system 8 receives a difference voltage between a DC voltage command value from a controller of the electric power supply unit and a charged voltage of the capacitor C2 in the electric power conversion circuit 1 or a rectified DC voltage. This difference voltage constitutes a command value to make the voltage rectified by the electric power conversion circuit 1 match the DC voltage command value. The DC voltage control system 8 converts this difference voltage into an AC voltage signal, which is further converted into a quantity that can be multiplied with an AC voltage taken from the AC power supply in front of the interrupting circuit 2. The converted AC voltage signal is then multiplied with the AC voltage of the AC power supply to produce an AC input current command. This AC input current command and an output of the current detector CT are subjected to a subtraction operation to calculate a difference between the command value and the actual input current value, which is then fed to the instantaneous current control system 6. The difference signal is fed through a current control circuit 61 in the instantaneous current control system 6 to an inverted input terminal of a comparator 62. At its non-inverted input terminal the comparator 62 receives a sawtooth wave signal as a modulation signal. The comparator 62 compares the sawtooth wave signal and the output of the current control circuit 61 to produce a PWM instantaneous current control signal (also called a first arm gate signal). The instantaneous current control signal is entered into the command input blocking circuit 4 and at the same time is inverted by an inverter IV1 before being input to the command input blocking circuit 4. These two signals are passed through the command input blocking circuit 4 to the drive signal generation circuit 5. Based on the instantaneous current control signal and its inverted signal, the drive signal generation circuit 5 generates a drive signal for activating a converter operation that controls the conductions of the switching elements T1 and T2 in the first switch group SW1 to charge the capacitor C2 (an operation to rectify AC power into DC power). The converter operation may be performed by controlling the conductions of the switching elements T3 and T4.

The instantaneous voltage control system 7 receives as an input a difference between an output voltage command from the effective voltage value control system 9 and an actual AC output voltage to produce an instantaneous voltage control signal. The output voltage command is generated as follows. A difference is taken between a DC output voltage command value from the controller of the electric power supply unit and the AC output voltage from the electric power conversion circuit 1 which is transformed into an effective value by an effective value calculation circuit 11. This difference is input to the effective voltage value control system 9 where it is converted into an AC value, which is then multiplied with an output of a PLL circuit 10 to produce the output voltage command. The output of the PLL circuit 10 is a sinusoidal wave in synchronism with the input voltage. In the instantaneous voltage control system 7, the input after passing through a voltage control circuit 71 is divided in two, one of which is fed to a comparator 72 and the other is fed through a phase inversion circuit 73 to a comparator 74. These comparators 72, 74 compare these inputs with the sawtooth wave signal as a modulation signal to produce PWM instantaneous voltage control signals (also called second arm gate signal and third arm gate signal) which are fed as is to the command input blocking circuit 4. The PWM signals are also inverted by inverters IV2, IV3, respectively, before being input to the command input blocking circuit 4. These four instantaneous voltage control signals are input to the drive signal generation circuit 5, which generates drive signals for activating inverter operations that control the conductions of the semiconductor switching elements T3 to T6 in the second and third switch groups SW2 and SW3 to convert the DC voltage appearing across the capacitor C2 into an AC voltage. The second switch group SW2 can of course be used for the converter operation, as described earlier.

Figure 2:
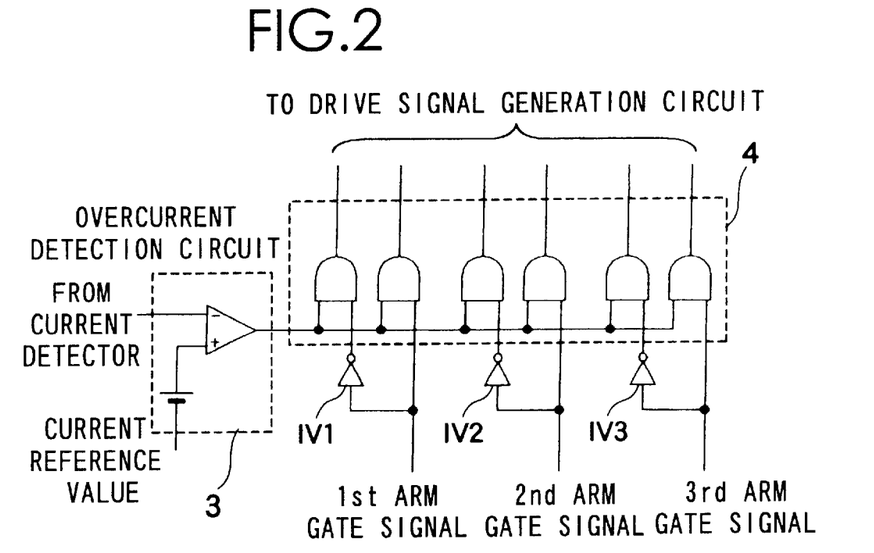
FIG. 2 is a circuit diagram showing a configuration of a command input blocking circuit.

FIG. 2 shows the command input blocking circuit 4 and its associated circuits. The command input blocking circuit 4 comprises six AND circuits. The output of the instantaneous current control system 6 constitutes gate signals of the first arm, and the outputs of the instantaneous voltage control system 7 constitute gate signals of the second and third arms, with these gate signals and their inverted signals supplied to the associated input terminals of the six AND circuits in the command input blocking circuit 4. The overcurrent detection circuit 3 receives a current value from the current detector CT. When the current value is higher than the current reference value, the overcurrent detection circuit 3 decides that there is an overcurrent state and outputs a low level signal to the six AND circuits making up the command input blocking circuit 4, which in turn blocks six gate signals. When the output of the current detector CT is equal to or less than the reference value, the overcurrent detection circuit 3 outputs a high level signal, allowing the gate signals to pass through the command input blocking circuit 4.

In this embodiment, as a phase difference between the input AC voltage and the output AC voltage of the electric power conversion circuit 1 increases, an overcurrent flows into the electric power conversion circuit 1. The current flowing into the electric power conversion circuit 1 is detected by the current detector CT. When the overcurrent detection circuit 3 determines that the input current detected by the current detector CT is higher than a predetermined current value (overcurrent), the command input blocking circuit 4 blocks the instantaneous current control signal and the instantaneous voltage control signals from being supplied to the drive signal generation circuit 5. This brings into a non-conducting state the switching elements T1 to T6 making up the first to third switch groups SW1 to SW3 of the electric power conversion circuit 1, thereby preventing an overcurrent from flowing through these switching elements T1–T6 and destroying them.

When the command input blocking circuit 4 blocks the instantaneous current control signal and the instantaneous voltage control signals from being fed to the drive signal generation circuit 5, the switching elements T1–T6 of the electric power conversion circuit 1 become non-conducting, sharply reducing the overcurrent. Hence, the overcurrent detection circuit 3 no longer detects an overcurrent, with the result that the command input blocking circuit 4 allows the instantaneous current control signal and the instantaneous voltage control signals to be applied to the drive signal generation circuit 5. Then, when the electric power conversion circuit 1 starts performing the conversion operation again, if the phase difference between the input AC voltage and the output AC voltage is still large, an overcurrent flows again. This overcurrent is detected by the overcurrent detection circuit 3, which in turn activates the command input blocking circuit 4 in a manner described above, thus bringing the electric power conversion circuit 1 to a rest. After this, this operation is repeated until the phase difference between the input AC voltage and the output AC voltage is small enough. When the overcurrent state continues, the interrupting circuit 2 with a slow responsiveness is open, completely interrupting the overcurrent. Until the interrupting circuit 2 is completely opened, the overcurrent is intermittently blocked by the command input blocking circuit 4, thereby protecting the switching elements T1–T6 used in the electric power conversion circuit 1 against being damaged.

Figure 3A:
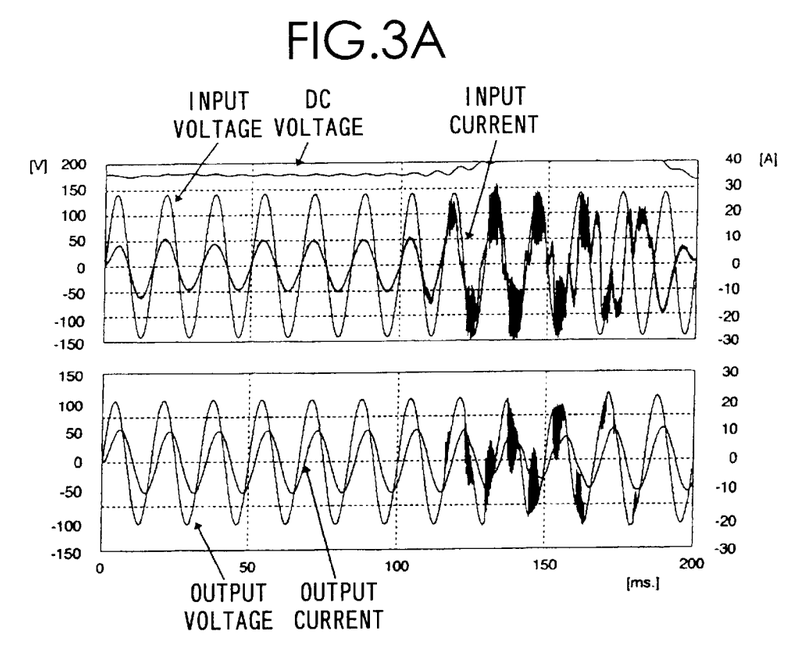
FIG. 3A illustrates waveforms of input and output currents and voltages in this embodiment.

FIG. 3A illustrates operation waveforms in the embodiment of FIG. 1, which are simulation waveforms of input/output currents and input/output voltages when the frequency of the input AC voltage is changed from 60 Hz to 70 Hz. In FIG. 3A, an upper diagram illustrates waveforms of an input current, an input voltage and a DC voltage appearing across the capacitor C2, and a lower diagram illustrates waveforms of an output current and an output voltage. The frequency of the input voltage that is 60 Hz during 0–100 ms changes to 70 Hz during 100–200 ms. Shortly after the frequency changes to 70 Hz, the input current gradually increases from a peak of 10 A. When the input current exceeds a peak of 20 A, the current is determined to be an overcurrent and limited to 20 A while oscillating. In the mean time, the DC voltage that was around 175 V increases and steps out of the scale of the graph. Then the interrupting circuit 2 is activated bringing the DC voltage to the original level before the time of 200 ms. The output during this process is shown in the lower diagram of FIG. 3A, in which no significant changes are observed except that the output voltage waveform exhibits an influence of oscillations of the input current.

Figure 3B:
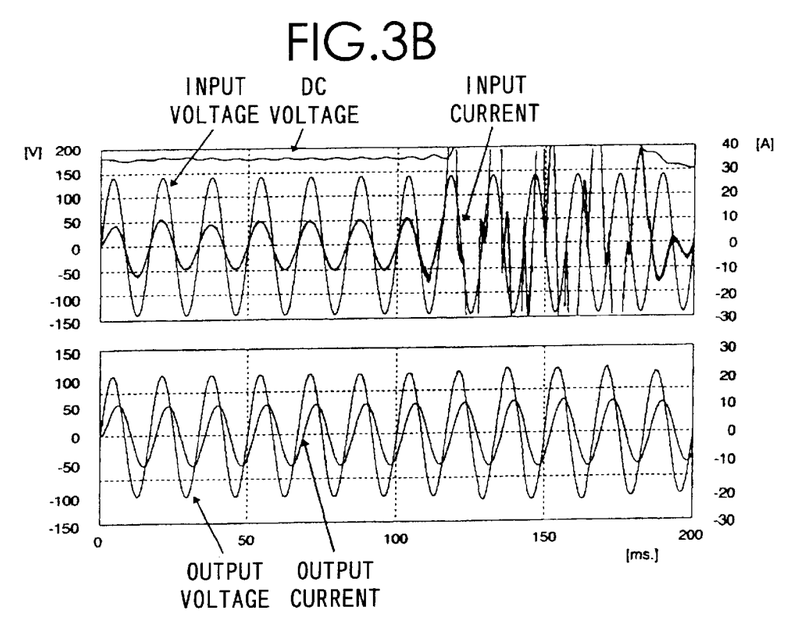
FIG. 3B illustrates waveforms of input and output currents and voltages when the command input blocking circuit is not inserted.

FIG. 3B shows waveforms when the command input blocking circuit 4 is not inserted. In an upper diagram representing the input side, shortly after 100 ms at which time the frequency is changed to 70 Hz, the input current gradually increases from a peak of 10 A and, in two cycles after the frequency switching, an overcurrent in excess of the scale range results. In this example, the overcurrent in excess of the scale range continues until sixth cycle after the frequency switching.

The input overcurrent caused by the phase deviation between the input and the output degrades the performances of the switching elements T1–T6 of the switch groups SW1–SW3 and even poses a risk of burning them.

Figure 4:
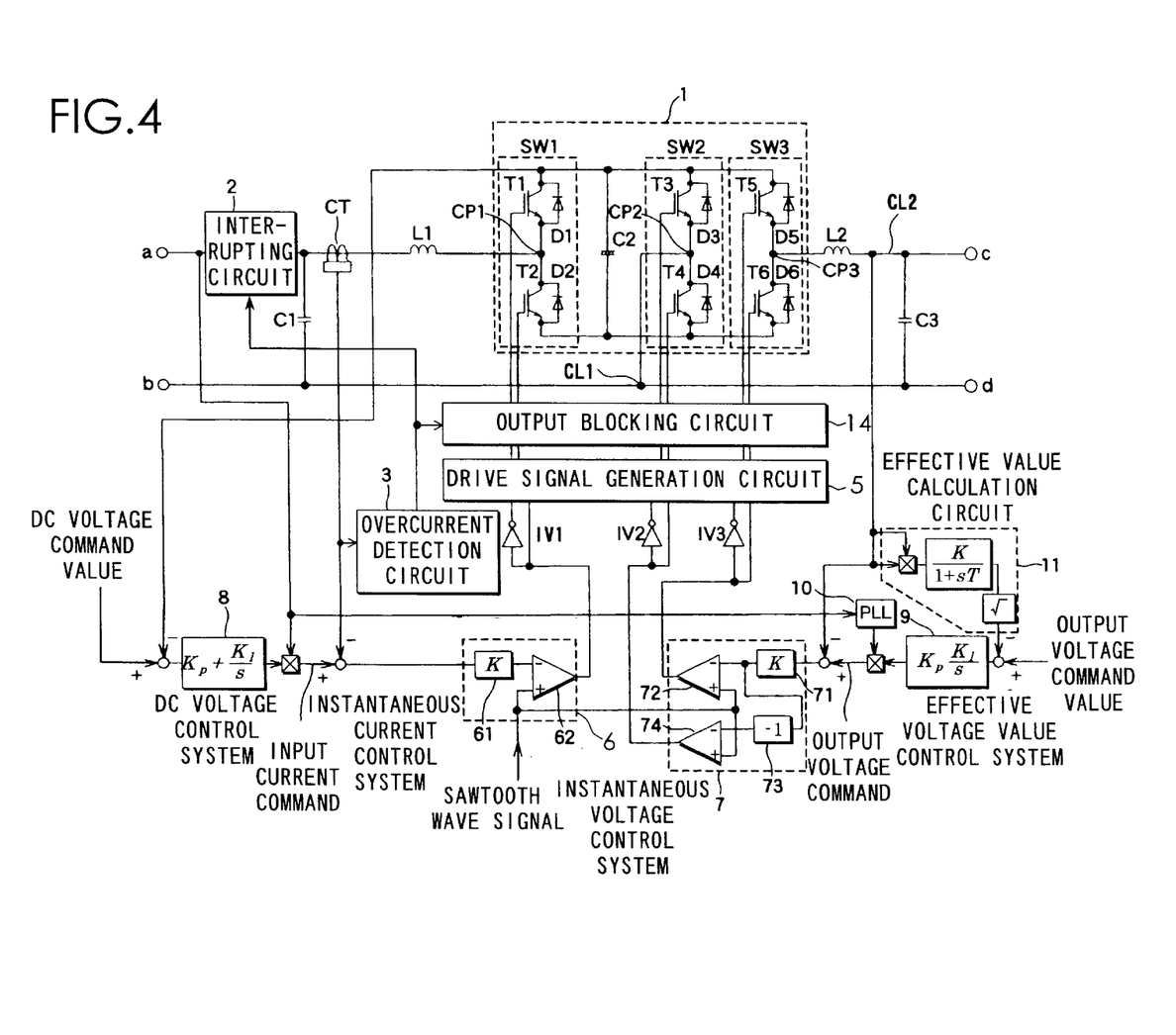
FIG. 4 is a circuit diagram showing a configuration of another embodiment of the electric power conversion apparatus according to the invention.

FIG. 4 is a circuit diagram showing a configuration of another embodiment of the electric power conversion apparatus according to the present invention. In the embodiment of FIG. 1, the command input blocking circuit 4 is provided on the input side of the drive signal generation circuit 5. The second embodiment differs from the first embodiment in that an output blocking circuit 14, which blocks drive signals from being output from the drive signal generation circuit 5 for as long as the overcurrent detection circuit 3 detects an overcurrent, is provided on the output side of the drive signal generation circuit 5. The configuration in other respects is similar to that of the embodiment of FIG. 1 and thus its explanation omitted. The output blocking circuit 14 used in this embodiment can also be realized in the similar construction to the command input blocking circuit 4 made up of AND circuits shown in FIG. 2.

The configuration of the control system for the electric power conversion circuit 1 has been described by taking an analog circuit for example. It should be noted, however, that the technical philosophy of the present invention can be realized by using a digital circuit and that the present invention includes a configuration of the control system constructed of the digital circuit. It is also known that the multiplication circuit, subtraction circuit, comparator, phase inversion circuit, effective value calculation circuit and others can be realized with digital circuits.

While the PWM gate signals have been described to be formed by using a sawtooth wave signal as a modulation signal, this invention is not limited to this example.

As described in the foregoing embodiments, the present invention offers the advantage that an input overcurrent caused by phase deviations between the input and the output of a 3-arm type power conversion apparatus can be prevented by the overcurrent detection circuit 3 and the command input blocking circuit 4 or output blocking circuit 14 inserted before or after the drive signal generation circuit 5. Another advantage of this invention is that the interrupting circuit 2 that interrupts an input current from an AC power supply can use switching means with a slower responsiveness than that of semiconductor switching elements, thus providing an inexpensive, small power conversion apparatus.

With this invention, in an electric power conversion apparatus using a so-called 3-arm type power conversion circuit, even when the interrupting circuit to prevent an inflow of an overcurrent into the input side caused by phase deviations between an input voltage and an output voltage uses switching means with a slow responsiveness to reduce the cost of the electric power conversion apparatus, the electric power conversion circuit can be protected against an overcurrent.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:
1. An electric power conversion apparatus comprising:
   an electric power conversion circuit having a first switch group, a second switch group, a third switch group, and a capacitor, all connected in parallel, the first switch group comprising a plurality of series-connected switching circuits, each having a switching element capable of controlling an electric conduction in one way and a diode connected anti-parallel to the switching element, the second and third switch groups being constructed in the same way as the first switch group;

a reactor arranged between an intermediate point in the first switch group and one of two input terminals of an AC power supply;

an instantaneous current control system for outputting an instantaneous current control signal according to a DC voltage command value;

an instantaneous voltage control system for outputting an instantaneous voltage control signal according to an output voltage command value;

a drive signal generation circuit for receiving the instantaneous current control signal and the instantaneous voltage control signal and applying drive signals at predetermined timings to a plurality of the switching elements making up the first to third switch groups of the electric power conversion circuit to make the electric power conversion circuit perform a converter operation and an inverter operation;

an interrupting circuit connected between said one of the terminals of the AC power supply and the reactor and adapted to enter an interrupting state to block the AC voltage of the AC power supply from being applied to the electric power conversion circuit when an overcurrent flows in from the AC power supply, the interrupting circuit using switching means with a slower response speed than that of semiconductor switching elements;

a current detector for measuring an AC current flowing into the intermediate point in the first switch group;

an overcurrent detection circuit for detecting the overcurrent based on an output from the current detector; and a command input blocking circuit for blocking the instantaneous current control signal and the instantaneous voltage control signal from being input to the drive signal generation circuit for as long as the overcurrent is detected by the overcurrent detection circuit.

2. An electric power conversion apparatus according to claim 1, wherein the drive signal generation circuit is so constructed that it receives the instantaneous current control signal and the instantaneous voltage control signal and applies drive signals at predetermined timings to a plurality of the switching elements making up the first to third switch groups of the electric power conversion circuit in order to control conductions of a plurality of the switching elements making up the first switch group to make the electric power conversion circuit perform the converter operation for charging the capacitor and in order to control conductions of a plurality of the switching elements making up the second and third switch groups to make the electric power conversion circuit perform the inverter operation for converting a DC voltage appearing across the capacitor into an AC voltage, thereby outputting the converted AC voltage from an intermediate point in the second switch group and from an intermediate point in the third switch group.

3. An electric power conversion apparatus according to claim 1, wherein the drive signal generation circuit is so constructed that it receives the instantaneous current control signal and the instantaneous voltage control signal and applies drive signals at predetermined timings to a plurality of the switching elements making up the first to third switch groups of the electric power conversion circuit in order to control conductions of a plurality of the switching elements making up the first and second switch groups to make the electric power conversion circuit perform the converter operation for charging the capacitor and in order to control conductions of a plurality of the switching elements making up the second and third switch groups to make the electric power conversion circuit perform the inverter operation for converting a DC voltage appearing across the capacitor into an AC voltage, thereby outputting the converted AC voltage from an intermediate point in the second switch group and from an intermediate point in the third switch group.

4. An electric power conversion apparatus according to claim 1, wherein the switching means in the interrupting circuit is electromagnetic relays.

5. An electric power conversion apparatus comprising:

an electric power conversion circuit having a first switch group, a second switch group, a third switch group, and a capacitor, all connected in parallel, the first switch group comprising two series-connected switching circuits, each having a switching element capable of controlling an electric conduction in one way and a diode connected anti-parallel to the switching element, the second and third switch groups being constructed in the same way as the first switch group;

a first reactor arranged between an intermediate point in the first switch group and one of two input terminals of an AC power supply;

a first connection circuit for electrically connecting an intermediate point in the second switch group to the other of the two input terminals of the AC power supply and to one of two AC output terminals;

a second connection circuit for electrically connecting an intermediate point in the third switch group to the other of the two AC output terminals through a second reactor;

an instantaneous current control system for outputting an instantaneous current control signal according to a DC voltage command value;

an instantaneous voltage control system for outputting an instantaneous voltage control signal according to an output voltage command value;

a drive signal generation circuit for receiving the instantaneous current control signal and the instantaneous voltage control signal and applying drive signals at predetermined timings to a plurality of the switching elements making up the first to third switch groups of the electric power conversion circuit in order to control conductions of a plurality of the switching elements making up the first and second switch groups to make the electric power conversion circuit perform the converter operation for charging the capacitor and in order to control conductions of a plurality of the switching elements making up the second and third switch groups to make the electric power conversion circuit perform the inverter operation for converting a DC voltage appearing across the capacitor into an AC voltage, thereby outputting the converted AC voltage from an intermediate point in the second switch group and from an intermediate point in the third switch group;

an interrupting circuit connected between said one of the terminals of the AC power supply and the first reactor and adapted to enter an interrupting state to block the AC voltage of the AC power supply from being applied to the electric power conversion circuit when an overcurrent is produced by a phase difference between the AC voltage of the AC power supply and the AC voltage converted by the electric power conversion circuit, the interrupting circuit using switching means with a slower response speed than that of semiconductor switching elements;

a current detector for measuring an AC current flowing into the intermediate point in the first switch group;

an overcurrent detection circuit for detecting the overcurrent based on an output from the current detector; and a command input blocking circuit for blocking the instantaneous current control signal and the instantaneous voltage control signal from being input to the drive signal generation circuit for as long as the overcurrent is detected by the overcurrent detection circuit.

6. An electric power conversion apparatus according to claim 5, wherein the switching means in the interrupting circuit is electromagnetic relays.

7. An electric power conversion apparatus comprising:

an electric power conversion circuit having a first switch group, a second switch group, a third switch group, and a capacitor, all connected in parallel, the first switch group comprising a plurality of series-connected switching circuits, each having a switching element capable of controlling an electric conduction in one way and a diode connected anti-parallel to the switching element, the second and third switch groups being constructed in the same way as the first switch group;

a reactor arranged between an intermediate point in the first switch group and one of two input terminals of an AC power supply;

an instantaneous current control system for outputting an instantaneous current control signal according to a DC voltage command value;

an instantaneous voltage control system for outputting an instantaneous voltage control signal according to an output voltage command value;

a drive signal generation circuit for receiving the instantaneous current control signal and the instantaneous voltage control signal and applying drive signals at predetermined timings to a plurality of the switching elements making up the first to third switch groups of the electric power conversion circuit to make the electric power conversion circuit perform a converter operation and an inverter operation;

an interrupting circuit connected between said one of the terminals of the AC power supply and the reactor and adapted to enter an interrupting state to block the AC voltage of the AC power supply from being applied to the electric power conversion circuit when an overcurrent flows in from the AC power supply, the interrupting circuit using switching means with a slower response speed than that of semiconductor switching elements;

a current detector for measuring an AC current flowing into the intermediate point in the first switch group;

an overcurrent detection circuit for detecting the overcurrent based on an output from the current detector; and an output blocking circuit for blocking the drive signals from being output from the drive signal generation circuit for as long as the overcurrent is detected by the overcurrent detection circuit.

8. An electric power conversion apparatus according to claim 7, wherein the switching means in the interrupting circuit is electromagnetic relays.

9. An electric power conversion apparatus comprising:

an electric power conversion circuit having a first switch group, a second switch group, a third switch group, and a capacitor, all connected in parallel, the first switch group comprising two series-connected switching circuits, each having a switching element capable of controlling an electric conduction in one way and a diode connected anti-parallel to the switching element, the second and third switch groups being constructed in the same way as the first switch group;

a first reactor arranged between an intermediate point in the first switch group and one of two input terminals of an AC power supply;

a first connection circuit for electrically connecting an intermediate point in the second switch group to the other of the two input terminals of the AC power supply and to one of two AC output terminals;

a second connection circuit for electrically connecting an intermediate point in the third switch group to the other of the two AC output terminals through a second reactor;

an instantaneous current control system for outputting an instantaneous current control signal according to a DC voltage command value;

an instantaneous voltage control system for outputting an instantaneous voltage control signal according to an output voltage command value;

a drive signal generation circuit for receiving the instantaneous current control signal and the instantaneous voltage control signal and applying drive signals at predetermined timings to a plurality of the switching elements making up the first to third switch groups of the electric power conversion circuit in order to control conductions of a plurality of the switching elements making up the first and second switch groups to make the electric power conversion circuit perform the converter operation for charging the capacitor and in order to control conductions of a plurality of the switching elements making up the second and third switch groups to make the electric power conversion circuit perform the inverter operation for converting a DC voltage appearing across the capacitor into an AC voltage, thereby outputting the converted AC voltage from an intermediate point in the second switch group and from an intermediate point in the third switch group;

an interrupting circuit connected between said one of the terminals of the AC power supply and the first reactor and adapted to enter an interrupting state to block the AC voltage of the AC power supply from being applied to the electric power conversion circuit when an overcurrent is produced by a phase difference between the AC voltage of the AC power supply and the AC voltage converted by the electric power conversion circuit, the interrupting circuit using switching means with a slower response speed than that of semiconductor switching elements;

a current detector for measuring an AC current flowing into the intermediate point in the first switch group;

an overcurrent detection circuit for detecting the overcurrent based on an output from the current detector; and an output blocking circuit for blocking the drive signals from being output from the drive signal generation circuit for as long as the overcurrent is detected by the overcurrent detection circuit.

10. An electric power conversion apparatus according to claim 9, wherein the switching means in the interrupting circuit is electromagnetic relays.

* * * * *

UNITED STATES PATENT AND TRADEMARK OFFICE
CERTIFICATE OF CORRECTION

PATENT NO. : 6,671,191 B2  Page 1 of 1
DATED : December 30, 2003
INVENTOR(S) : Hanaoka et al.

It is certified that error appears in the above-identified patent and that said Letters Patent is hereby corrected as shown below:

<u>Title page,</u>
Item [75], Inventors, delete "Toshima-ku" and insert -- Nagano -- (all occurences).

Signed and Sealed this

Ninth Day of March, 2004

JON W. DUDAS
*Acting Director of the United States Patent and Trademark Office*